United States Patent
Schmid et al.

(10) Patent No.: US 6,363,711 B2
(45) Date of Patent: Apr. 2, 2002

(54) COMBINED-CYCLE POWER PLANT WITH FEED-WATER PREHEATER BYPASS

(75) Inventors: Erich Schmid, Marloffstein; Helmut Stierstorfer, Erlangen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/782,737

(22) Filed: Feb. 13, 2001

Related U.S. Application Data

(62) Division of application No. 09/513,617, filed on Feb. 25, 2000, now Pat. No. 6,237,321, which is a continuation of application No. PCT/DE98/02329, filed on Aug. 12, 1998.

(30) Foreign Application Priority Data

Aug. 25, 1997 (DE) .......................................... 197 36 889

(51) Int. Cl.⁷ ................................................. F02C 6/18
(52) U.S. Cl. ..................................... 60/39.182; 122/7 R
(58) Field of Search ........................ 60/39.182; 122/7 R

(56) References Cited

U.S. PATENT DOCUMENTS 4,976,100 A    12/1990   Lee
5,365,730 A    11/1994   Bruckner et al.

FOREIGN PATENT DOCUMENTS

| EP | 0 148 973 B1 | 7/1985 |
| EP | 0 281 151 A2 | 9/1988 |
| EP | 0 400 370 A2 | 12/1990 |
| FR | 2 551 181 | 3/1985 |

OTHER PUBLICATIONS

Patent Abstracts of Japan No. 01–113507 (Naotake), dated May 2, 1989.

*Primary Examiner*—Louis J. Casaregola
(74) *Attorney, Agent, or Firm*—Herbert L. Lerner; Laurence A. Greenberg; Werner H. Stemer

(57) ABSTRACT

A combined-cycle power plant includes a steam turbine having at least one low-pressure stage and a high-pressure stage, a feed-water preheater associated with the high-pressure stage, a bypass line connected in parallel with the feed-water preheater, a gas turbine operable with both gas and oil as fuel and having a flue-gas side, and a waste-heat steam generator disposed downstream of the gas turbine on the flue-gas side for generating steam for the steam turbine.

2 Claims, 1 Drawing Sheet

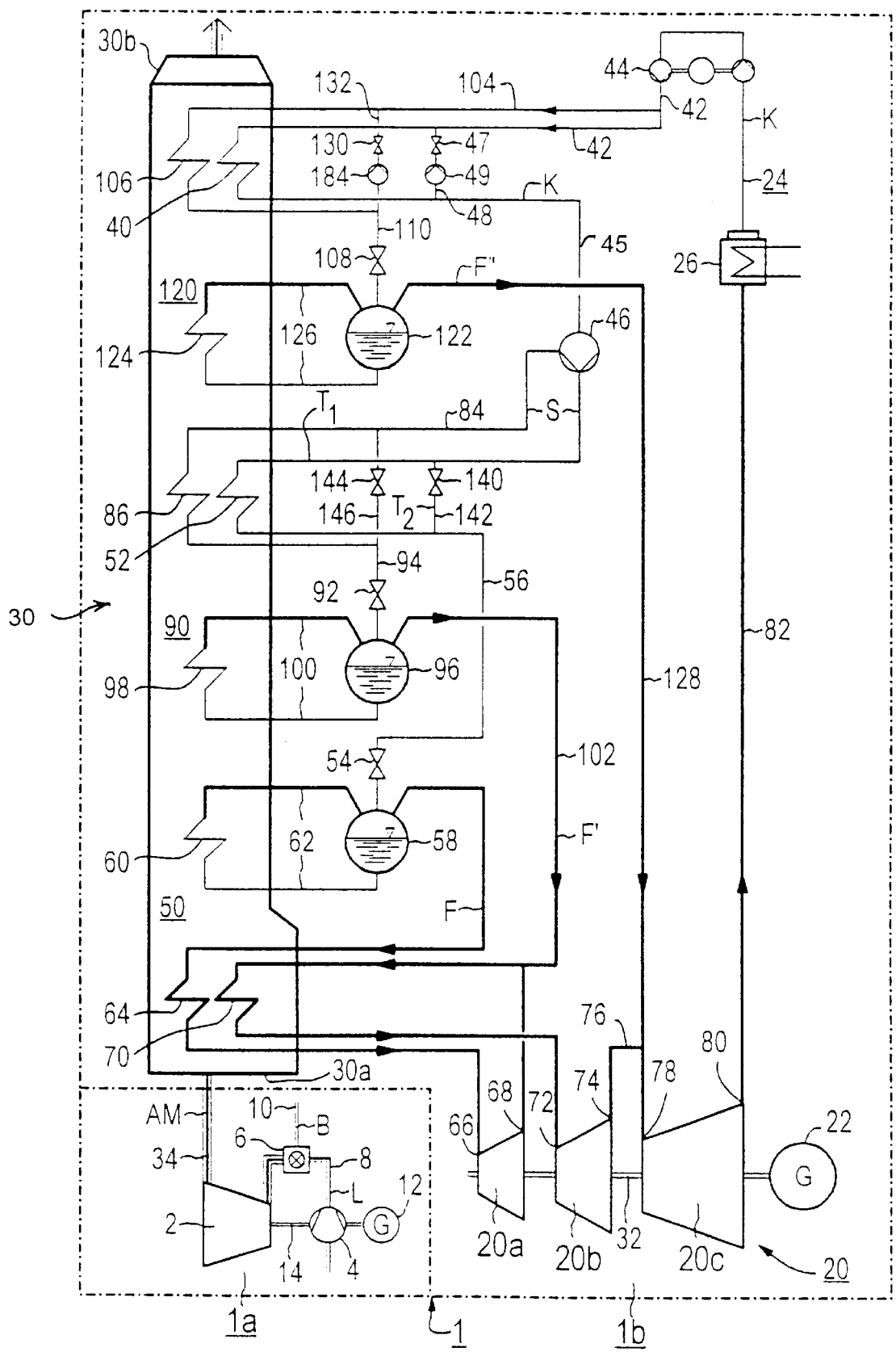

COMBINED-CYCLE POWER PLANT WITH FEED-WATER PREHEATER BYPASS

CROSS-REFERENCE TO RELATED APPLICATION

This is a division of U.S. application Ser. No. 09/513,617, filed Feb. 25, 2000 U.S. Pat. No. (6,237,321), which was a continuation of copending International Application No. PCT/DE98/02329, filed Aug. 12, 1998, which designated the United States.

BACKGROUND OF THE INVENTION

Field of the Invention

The invention relates to a combined-cycle power plant which includes a gas turbine operable with both gas and oil as fuel and which has a waste-heat steam generator downstream of the gas turbine on the flue-gas side for generating steam for an associated steam turbine having at least one high-pressure stage.

In a combined-cycle power plant, the heat contained in the expanded working medium from the gas turbine is utilized in order to generate steam for the steam turbine. Heat transmission takes place in a waste-heat steam generator which is downstream of the gas turbine and in which heating surfaces in the form of tubes or tube bundles are disposed. Those heating surfaces, in turn, are connected into a water/steam circuit of the steam turbine. The water/steam circuit includes one or more, for example two or three, pressure stages. Each pressure stage conventionally has a preheating heating surface (economizer), an evaporator heating surface and a superheater heating surface. Depending on the pressure conditions prevailing in the water/steam circuit of the steam turbine, a thermodynamic efficiency of about 50% or more is achieved through the use of a combined-cycle power plant of that type which is known, for example, from European Patent 0 148 973 B1.

The gas turbine of a combined-cycle power plant of that type may be constructed to operate with different kinds of fuel. However, the requirements placed on the waste-heat steam generator downstream of the gas turbine on the flue-gas side are different, depending on the type of fuel on which the construction is based. For example, gas used as a fuel for the gas turbine normally has high purity, so that flue gas flowing out of the gas turbine contains only small amounts of impurities.

In contrast thereto, if the fuel for the gas turbine is fuel oil, impurities in the flue gas flowing out of the gas turbine are to be expected. In that case, in particular, sulfur dioxide ($SO_2$) or sulfur trioxide ($SO_3$) may occur, which, after reacting with water in the form of sulfuric acid ($H_2SO_4$), may settle on the heating surfaces in the waste-heat steam generator and attack them. The requirements placed on the waste-heat steam generator when oil is used as a fuel for the gas turbine must therefore be different from those when gas is used as the fuel for the latter.

In particular, when oil is used as a fuel for the gas turbine, it is necessary to ensure that the heating surfaces connected into the water/steam circuit of the steam turbine and the line components inside the waste-heat steam generator are at a sufficiently high temperature, namely a temperature above the dew point of sulfuric acid. For that purpose, when the gas turbine operates with oil, the inlet temperature of the water or condensate flowing into the waste-heat steam generator is raised, as compared with the gas turbine operating with gas, and is set at about 120° to 130° C.

A combined-cycle power plant, in which fuel oil is only provided as a fuel for the gas turbine for a brief operating period, for example for 500 to 1,500 h/a, as a "back-up" to natural gas, is usually constructed and optimized primarily for the gas turbine to operate with natural gas. In order to ensure that, when the gas turbine operates with fuel oil, the condensate flowing into the waste-heat steam generator has a sufficiently high inlet temperature, the necessary heat may be extracted from the waste-heat steam generator itself in various ways.

One possibility is to bypass a conventionally provided condensate preheater completely or partially and to heat the condensate by the supply of low-pressure steam in a feed-water tank connected into the water/steam circuit. However, at low steam pressures, such a method necessitates a large-volume and possibly multi-stage heating steam system in the feed-water tank and, in the case of long heating-up periods, that may put at risk a deaeration function which normally takes place in the feed-water tank.

In order to ensure effective deaeration of the condensate, the condensate temperature in the feed-water tank must always be maintained in a temperature range of between 130° and 160° C., and the heating-up period of the condensate in the feed-water tank should be kept as short as possible. That may be carried out, for example, by preheating the condensate through an additional preheater heated through the use of steam.

In order to provide sufficient heat for that purpose, in the case of two-pressure or three-pressure plants it is often necessary to extract hot water from a high-pressure economizer of the waste-heat steam generator. However, the disadvantage thereof, particularly in the case of three-pressure plants, is that the delivery of a normally provided high-pressure feed pump may be influenced, and that the additional condensate preheater has to be constructed in a particularly inefficient way for the high pressure and large temperature differences.

Furthermore, in the case of fuel-oil operation, throttle losses of the feed pump or each feed pump occur adversely. Moreover, the extraction of hot water from the high-pressure economizer leads to a reduction in the high-pressure steam quantity due to a lowering of a so-called high-pressure approach temperature, thus in turn leading to a reduction in plant efficiency.

Another proven method is, when the gas turbine operates with oil, to assist the heating-up of the condensate in the feed-water tank or in the deaerator through the use of steam extracted from an intermediate superheater line. However, that method cannot be employed in the case of plants without a feed-water tank or without a deaerator.

The above-mentioned concepts of condensate preheating when oil is used as a fuel for the gas turbine are complicated in view of the components which are required as well as in view of the operating mode of the combined-cycle power plant. Moreover, plant efficiency is only limited when the gas turbine operates with oil.

SUMMARY OF THE INVENTION

It is accordingly an object of the invention to provide a combined-cycle power plant, which overcomes the hereinaforementioned disadvantages of the heretofore-known methods and devices of this general type and which achieve a particularly high plant efficiency at a low outlay in terms of apparatus and operation requirements, irrespective of a fuel used for a gas turbine.

With the foregoing and other objects in view there is provided, in accordance with the invention, a method for operating a combined-cycle power plant, which comprises utilizing heat contained in an expanded working medium of an associated gas turbine operable with both gas and oil as fuel, for generating steam for an associated steam turbine having at least one high-pressure stage; and after a change of the gas turbine from gas to oil operation, dividing feed water to be supplied to the at least one high-pressure stage into first and second partial streams, only one of the partial streams being preheated.

The invention proceeds from the concept that the condensate preheating which is additionally necessary when the gas turbine operates with oil is ensured by particularly simple measures and in a particularly simple way by transmitting the heat required for this purpose to the condensate not through the water/steam circuit, but instead through the flue gas from the gas turbine. In this case, the components, such as heat exchangers, mixing preheaters, steam reducing stations and/or corresponding pipelines, for example, which are necessary in the transmission of heat through the water/steam circuit, may be dispensed with. Instead, when a gas turbine operates with oil, the extraction of heat from the flue gas of the gas turbine is reduced at a suitable point, as compared with the operation of the gas turbine with gas, so that a sufficiently large amount of exhaust-gas heat is available for condensate preheating.

In this case, the feed-water preheating for the high-pressure stage of the steam turbine is provided by a suitable modification of the extraction of heat from the flue gas of the gas turbine. In a combined-cycle power plant constructed as a three-pressure plant, a corresponding modification of the feed-water preheating for the medium-pressure stage, which modification is dependent on the operating mode, may also be provided alternatively or additionally.

In accordance with another mode of the invention, after the change of the operation of the gas turbine from gas to oil, the operating pressure in a low-pressure stage of the steam turbine is increased. This ensures that the heat which remains in the flue gas due to the comparatively lower preheating of the feed water for the high-pressure stage, when the gas turbine operates with oil, is not transmitted to the water/steam circuit of the steam turbine through the low-pressure heating surfaces but, in actual fact, is carried further in the flue gas and is thus provided reliably for condensate preheating.

In this case, the operating pressure in the low-pressure stage may be set in such a way that steam production in the low-pressure stage comes to a stop. Expediently, however, the operating pressure in the low-pressure stage of the steam turbine is raised, for example to about 10 to 15 bar, in such a way that only some minimum steam production for maintaining the system functions still remains in the low-pressure stage.

In accordance with a further mode of the invention, in order to provide particularly high efficiency, even in a transitional phase after a change in the operating mode of the gas turbine, a branching ratio between the first and the second partial stream is advantageously set as a function of the temperature of the condensate to be supplied to the high-pressure stage. In this case, the temperature of the condensate flowing into the waste-heat steam generator may be monitored in a particularly favorable way.

With the objects of the invention in view there is also provided a combined-cycle power plant, comprising a steam turbine having at least one low-pressure stage and a high-pressure stage; a feed-water preheater associated with the high-pressure stage; a bypass line connected in parallel with the feed-water preheater; a gas turbine operable with both gas and oil as fuel and having a flue-gas side; and a waste-heat steam generator disposed downstream of the gas turbine on the flue-gas side for generating steam for the steam turbine.

In accordance with a concomitant feature of the invention, particularly favorable adaptation of feed-water preheating to the respective operating conditions is made possible by connecting into the bypass line a valve capable of being set as a function of the temperature of the condensate to be supplied to the low-pressure stage.

The advantages achieved through the use of the invention are, in particular, that a water inlet temperature into the waste-heat steam generator which is necessary when the gas turbine operates with oil and which is increased, as compared with the operation of the gas turbine with gas, is ensured by particularly simple measures. The complicated components that are conventionally provided for the additional condensate preheating that is necessary for this purpose, for transmitting heat from the water/steam circuit to the condensate, for example by the supply of low-pressure steam, may be dispensed with. Instead, sufficient heat transmission to the condensate is ensured due to the fact that the flue gas from the gas turbine still contains sufficient heat in the region of the condensate preheaters. The additional condensate-preheating heat which is necessary when the gas turbine operates with oil is therefore transmitted to the condensate directly through the flue gas. The outlay in terms of construction and operational requirements which is necessary for this purpose is particularly low.

Furthermore, components of the water/steam circuit, such as, for example, high-pressure feed-water pumps, may be given comparatively small dimensions, since they do not have to be constructed for a bypass mode, when the gas turbine operates with oil, with additional water extraction from the economizer. Moreover, depending on the structure of the low-pressure stage of the steam turbine and of the condensate pump, water inlet temperatures into the waste-heat steam generator of up to and above 130° C. can be mastered. Virtually the entire fuel-oil spectrum for this purpose (back-up fuel) can therefore be covered, so that standardization is made possible.

Other features which are considered as characteristic for the invention are set forth in the appended claims.

Although the invention is illustrated and described herein as embodied in a combined-cycle power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic circuit diagram of a combined-cycle power plant.

DESCRIPTION OF THE PREFERRED EMBODIMENTS

Referring now in detail to the single FIGURE of the drawing, there is seen a combined-cycle power plant 1 which includes a gas-turbine plant 1*a* and a steam-turbine plant 1b. The gas-turbine plant 1a includes a gas turbine 2, with a coupled air compressor 4, and a combustion chamber 6 which precedes the gas turbine 2 and is connected to a fresh-air line 8 of the air compressor 4. A fuel line 10 opens into the combustion chamber 6 of the gas turbine 2. Gas or oil can be selectively supplied through the fuel line 10 to the combustion chamber 6 as a fuel B for the gas turbine 2. The gas turbine 2, the air compressor 4 and a generator 12 are seated on a common shaft 14.

The steam-turbine plant 1b includes a steam turbine 20, with a coupled generator 22, and a water-steam circuit 24 in which a condenser 26 following the steam turbine 20 and a waste-heat steam generator 30 are disposed. The steam turbine 20 is formed of a first pressure stage or high-pressure part 20a, a second pressure stage or medium-pressure part 20b and a third pressure stage or low-pressure part 20c which drive the generator 22 through a common shaft 32.

In order to supply working medium AM or flue gas expanded in the gas turbine 2 into the waste-heat steam generator 30, an exhaust-gas line 34 is connected to an inlet 30a of the waste-heat steam generator 30. The expanded working medium AM from the gas turbine 2 leaves the waste-heat steam generator 30, through an outlet 30b of the latter, in the direction of a non-illustrated chimney.

The waste-heat steam generator 30 includes a first condensate preheater 40 having an inlet side which can be fed with condensate K from the condenser 26 through a condensate line 42, into which a condensate pump unit 44 is connected. The condensate preheater 40 has an outlet side connected to a high-pressure pump 46. Moreover, the condensate line 42 is connected to a condensate line 45 through a circulating line 48 which can be shut off through the use of a valve 47 and into which a circulating pump 49 is connected. The circulating line 48, the condensate line 42, the condensate preheater 40 and the condensate line 45 thus form a circulating loop for the condensate K, so that there is no need for a feed-water tank. Moreover, in order to bypass the high-pressure preheater 40, if required, the condensate line 42 can be connected directly to the high-pressure pump 46 through a non-illustrated bypass line.

The high-pressure pump 46 brings the preheated condensate K, flowing out of the condensate preheater 40, to a pressure level suitable for a high-pressure stage 50 of the water/steam circuit 24. The high-pressure stage 50 is associated with the steam turbine 20. The condensate, which is under high pressure, can be supplied to the high-pressure stage 50 as feed water S through a first feed-water preheater 52. The feed-water preheater 52 has an outlet side connected to a high-pressure drum 58 through a feed-water line 56 that is capable of being shut off through the use of a valve 54. The high-pressure drum 58 is connected to a high-pressure evaporator 60 disposed in the waste-heat steam generator 30, so as to form a water-steam cycle 62. In order to provide for the discharge of fresh steam F, the high-pressure drum 58 is connected to a high-pressure superheater 64. The high-pressure superheater 64 is disposed in the waste-heat steam generator 30 and has an outlet side connected to a steam inlet 66 of the high-pressure part 20a of the steam turbine 20.

A steam outlet 68 of the high-pressure part 20a of the steam turbine 20 is connected through an intermediate superheater 70 to a steam inlet 72 of the medium-pressure part 20b of the steam turbine 20. A steam outlet 74 of the medium-pressure part 20b is connected through an overflow line 76 to a steam inlet 78 of the low-pressure part 20c of the steam turbine 20. A steam outlet 80 of the low-pressure part 20c of the steam turbine 20 is connected to the condenser 26 through a steam line 82, so that the closed water/steam circuit 24 is obtained.

Moreover, a branch line 84 branches off from the high-pressure pump 46 at a point at which the condensate K has reached a medium pressure. The branch line 84 is connected through a second feed-water preheater 86 to a medium-pressure stage 90 of the water/steam circuit. The medium-pressure stage 90 is associated with the steam turbine 20. The second feed-water preheater 86 has an outlet side connected to a medium-pressure drum 96 of the medium-pressure stage 90 through a feed-water line 94 capable of being shut off through the use of a valve 92. The medium-pressure drum 96 is connected to a medium-pressure evaporator 98 disposed in the waste-heat steam generator 30, so as to form a water-steam cycle. In order to provide for the discharge of medium-pressure fresh steam F', the medium-pressure drum 96 is connected through a steam line 102 to the intermediate superheater 70 and therefore to the steam inlet 72 of the medium-pressure part 20b of the steam turbine 20.

Moreover, a further condensate line 104 branches off from the condensate line 42 downstream of the condensate pump unit 44, as seen in the direction of flow of the condensate K, and opens into a second condensate preheater 106 disposed in the waste-heat steam generator 30. The second condensate preheater 106 has an outlet side connected through a condensate line 110 that is capable of being shut off through the use of a valve 108, to a low-pressure stage 120 of the water/steam circuit 24. The low-pressure stage 120 is associated with the steam turbine 20.

The low-pressure stage 120 includes a low-pressure drum 122 which is connected to a low-pressure evaporator 124 disposed in the waste-heat steam generator 30, so as to form a water/steam cycle 126. In order to provide for the discharge of low-pressure fresh steam F", the low-pressure drum 122 is connected to the overflow line 76 through a steam line 128. Moreover, the condensate line 110 is connected to the condensate line 104 through a circulating line 132 which is capable of being shut off through the use of a valve 130 and into which a circulating pump 184 is connected. Through the use of the circulating pump 184, condensate K can be circulated in a circulating loop formed by the circulating line 132, the condensate line 104, the condensate preheater 106 and the condensate line 110, so that there is no need for a feed-water tank. Moreover, in order to bypass the condensate preheater 106, if required, the condensate line 104 can be connected directly to the condensate line 110 through a bypass line which is not illustrated.

A bypass line 142 that is capable of being shut off through the use of a valve 140 is connected in parallel with the feed-water preheater 52 associated with the high-pressure stage 50. In this case, the valve 140 can be set as a function of the temperature of the condensate K to be supplied to the high-pressure stage 50 or to the medium-pressure stage 90. For this purpose, the valve 140 is connected in a non-illustrated manner to a controller unit, to which an input signal characteristic of the temperature of the condensate K to be supplied to the low-pressure stage 50 or to the medium-pressure stage 90 can be delivered.

A bypass line 146 which is capable of being shut off through the use of a valve 144 is likewise connected in parallel with the feed-water preheater 86 associated with the medium-pressure stage 90. In a similar way to the valve 140, the valve 144 can be set as a function of the temperature of the condensate K to be supplied to the high-pressure stage 50 or to the medium-pressure stage 90.

The gas turbine 2 of the combined-cycle power plant 1 can be operated with both gas and fuel oil as the fuel B. When the gas turbine 2 operates with gas, the working medium AM supplied to the waste-heat steam generator 30 has comparatively high purity, so that in this operating state, the efficiency of the water/steam circuit 24 can be optimized.

In this operating state, the valves 140, 144 are closed, so that the entire feed water S conveyed by the high-pressure pump 46 is led through the feed-water preheaters 52 or 86 and is preheated there.

When the gas turbine 2 operates with oil, the working medium AM supplied to the waste-heat steam generator 30 may contain impurities, in particular with sulfur dioxide $SO_2$ and with sulfuric acid $H_2SO_4$. In order to reliably avoid damage to structural parts within the waste-heat steam generator 30 in this operating state, all of the heating surfaces disposed in the waste-heat steam generator 30, that is to say, in particular, the condensate preheater 40 and the condensate preheater 106 as well, are operated at a temperature of more than the dew point of sulfuric acid. For this purpose, it is necessary to have an increased water inlet temperature for the condensate K flowing into the waste-heat steam generator 30 and consequently comparatively higher condensate preheating, as compared with the operation of the gas turbine 2 with gas.

This comparatively higher condensate preheating is not achieved by transmitting heat from the water/steam circuit 24 to the condensate K, but instead by transmitting heat from the working medium AM directly to the condensate K. For this purpose, after a change of the operation of the gas turbine 2 from gas to oil, the feed water S to be supplied to the high-pressure stage 50 and that to be supplied to the medium-pressure stage 90, are in each case divided into a first partial stream $T_1$ and a second partial stream $T_2$. In each case only one of the partial streams T1, T2 is preheated.

In order to achieve this, the valves 140 and 144 are in each case partially opened, so that the feed-water stream to be supplied to the high-pressure stage 50 is distributed to the feed-water preheater 52 and to the bypass line 142. The feed-water stream to be supplied to the medium-pressure stage 90 is likewise distributed to the feed-water preheater 86 and the bypass line 146. As a result, less heat is extracted from the working medium AM in the region of the feed-water preheaters 52, 86, as compared with the operation of the gas turbine 2 with gas.

Moreover, in order to ensure reliable transmission of this heat remaining in the working medium AM to the condensate K, the operating pressure in the low-pressure stage 120 is raised to about 10 to 15 bar. This prevents the heat which has additionally remained in the working medium AM from being absorbed through the low-pressure evaporator 124. Reliable additional heating-up of the condensate K through the condensate preheaters 40, 106 is thereby ensured.

The combined-cycle power plant 1 can be operated at inlet temperatures of the condensate K into the waste-heat steam generator 30 of up to and above 130° C. A broad spectrum of fuel oils (back-up fuel) can therefore be used for the gas turbine 2, so that standardization of the combined-cycle power plant 1, irrespective of fuel oil, is also possible.

We claim:

1. A combined-cycle power plant, comprising:
   a steam turbine having at least one low-pressure stage and a high-pressure stage;
   a feed-water preheater associated with said high-pressure stage;
   a bypass line connected in parallel with said feed-water preheater;
   a gas turbine operable with both gas and oil as fuel and having a flue-gas side; and
   a waste-heat steam generator disposed downstream of said gas turbine on said flue-gas side for generating steam for said steam turbine.

2. The combined-cycle power plant according to claim 1, including a valve in said bypass line, said valve being set in dependence on a temperature of condensate to be supplied to said high-pressure stage.

* * * * *